UNITED STATES PATENT OFFICE.

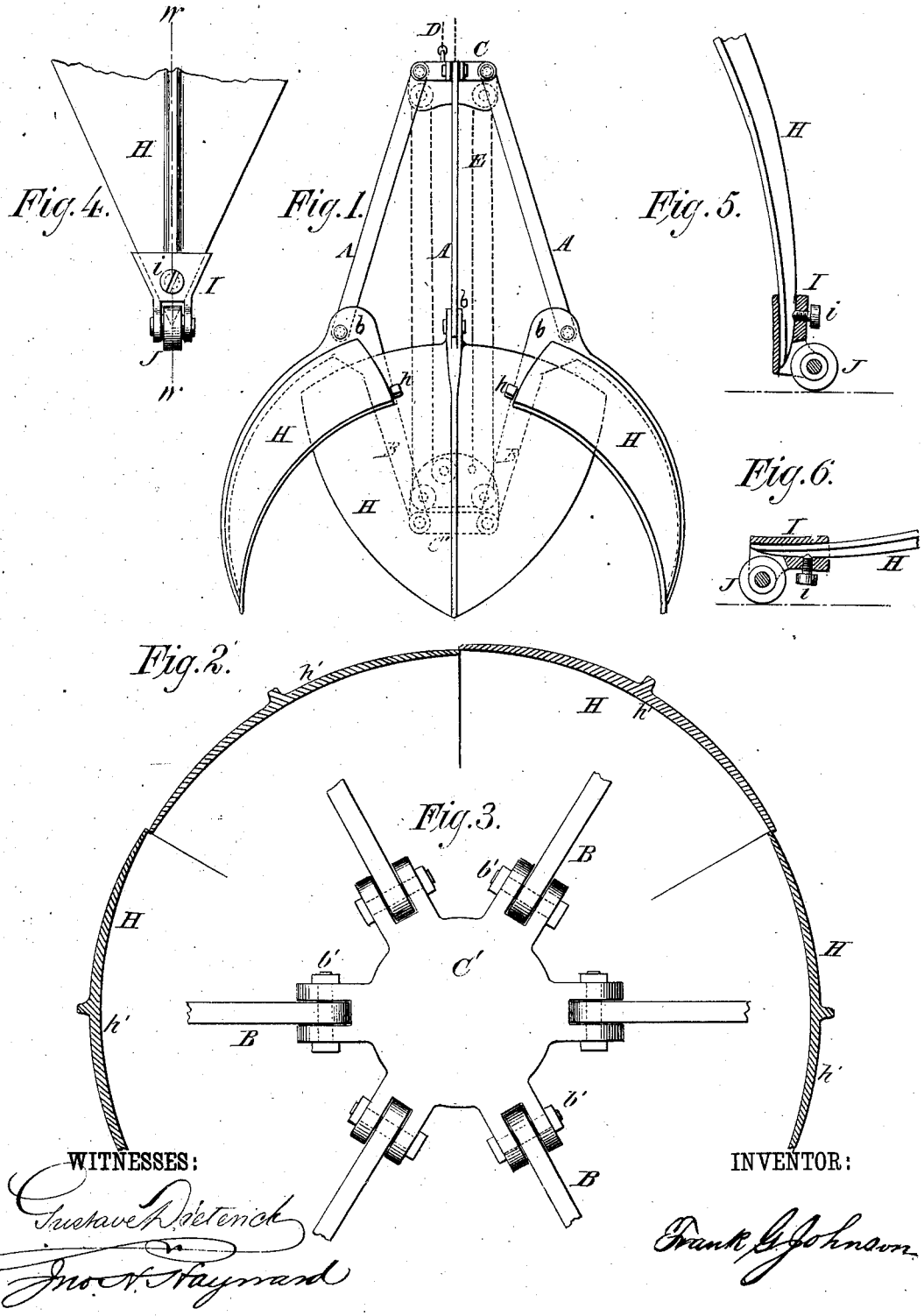

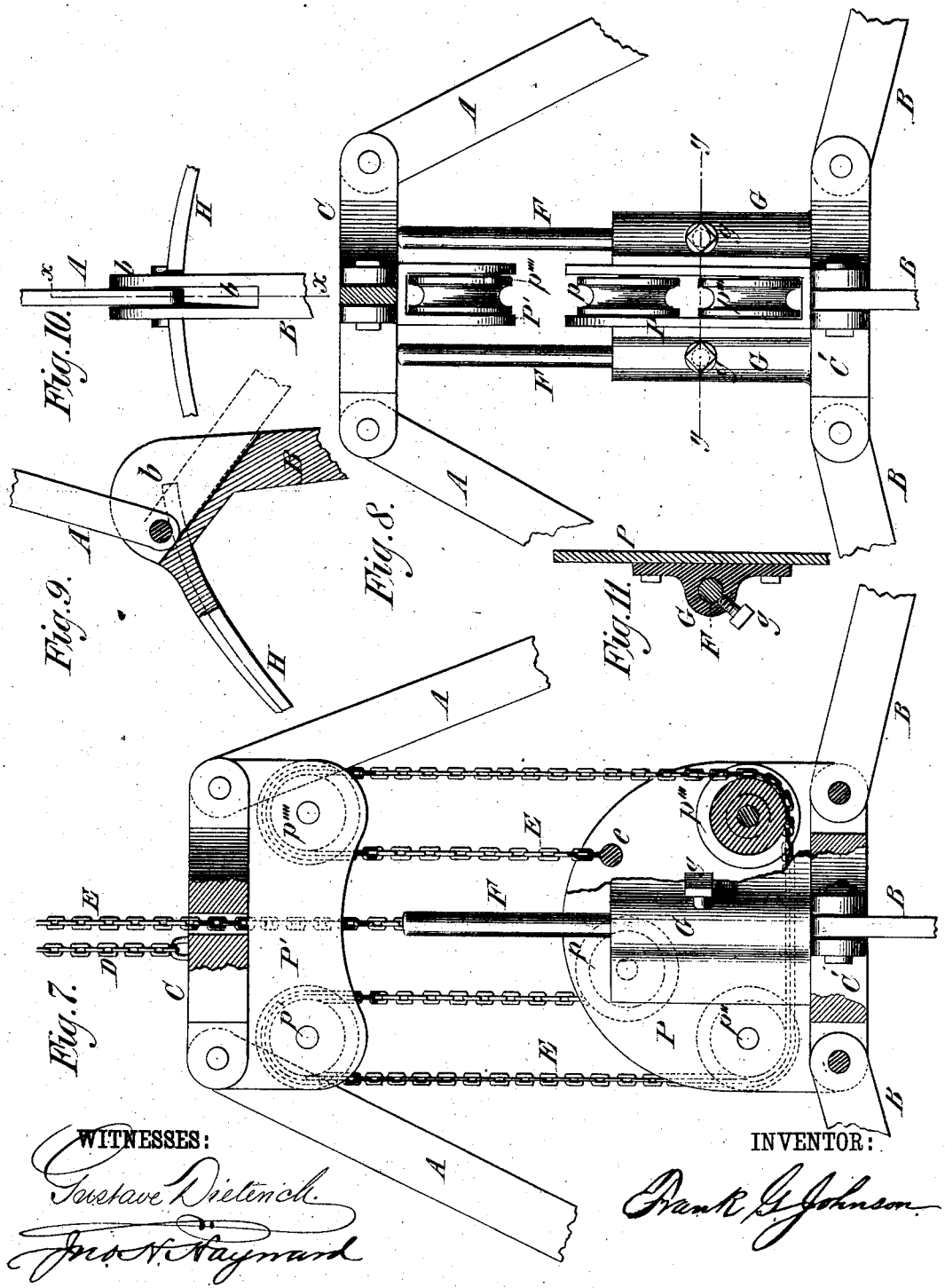

FRANK G. JOHNSON, OF BROOKLYN, NEW YORK.

GRAPPLING-BUCKET.

SPECIFICATION forming part of Letters Patent No. 245,073, dated August 2, 1881.

Application filed April 18, 1881. (No model.)

*To all whom it may concern:*

Be it known that I, FRANK G. JOHNSON, a citizen of the United States, residing at Brooklyn, in the county of Kings and State of New York, have invented certain new and useful Improvements in Automatic Grappling-Buckets, of which the following is a specification, reference being had to the accompanying drawings, in which like letters refer to like parts.

My invention relates more particularly to a semi-globular grappling-bucket for which Letters Patent of the United States were granted to me March 1, 1881, and numbered 238,293; and the improvements herein described consist, first, in the method of applying the power to open and to close such buckets, as shown in Figures 1 and 7; second, in the peculiar shape of the blades, whereby alternate sections of the bucket, when it (the bucket) is open, will closely fit into and over each other, as illustrated in Fig. 2; third, in the form of the journal-plates, as shown in Fig. 3; fourth, in providing an adjustable closing-stop, as shown in Figs. 7, 8, and 11; fifth, in providing an opening-stop, as illustrated in Fig. 1; sixth, in providing the points of the blades with adjustable rollers or casters to protect the flooring of scows and other vessels from injurious action of the buckets, as illustrated in Figs. 4, 5, and 6; seventh, the peculiar form of the carrying-arms, as shown in Figs. 9 and 10.

A more complete description of these improvements and the object of them are set forth as follows:

Fig. 1 represents an automatic bucket as seen when open. When it is closed the form of the body of it is semi-globular in shape, consisting of four equal sections, H H H, of a hollow globe secured to the carrying-arms B B. The number of sections, however, is not limited to four, as any greater number may be used.

A A A are the closing-arms, which at their lower ends are fastened into the carrying-arms by means of a simple bolt, and work in slots, as shown at $b\ b$, formed in the carrying-arms B B B. The upper ends of these working arms A A A are secured to radial projections of the head-plate C by means of bolts, as shown in Fig. 3. The lower ends of the carrying-arms B B B are attached to and work in the radial arms of the foot-plate C' by bolts, also illustrated by Fig. 3.

By drawing the head-plate C down toward the foot-plate C' the bucket is closed. The method of closing the bucket is better seen by referring to Fig. 7.

To the radial head-plate C are cast or otherwise attached sheave-plates B' of peculiar shape, and to the radial foot-plate C' are cast or otherwise attached sheave-plates P of peculiar shape. Within these two sets of sheave-plates are arranged five sheaves, $p, p', p'', p''', $ and $p''''$. Woven around these sheaves is the closing and hoisting chain (or rope) E E E, the attached ends of which are secured between the lower sheave-plates, P, at $e$ by means of a bolt.

The arrangement of the sheaves and chain and its attachment in the peculiar manner shown accomplish two essential results, one to equalize the draft between the head-plate C and foot-plate C', so that when the bucket is being closed they will not tilt more in one direction than any other. The other result is to bring the upper end of the closing and hoisting chain central with the bucket itself to prevent it from tilting to one side. The fixed end of the closing-chain is at $e$, which is twice the distance from the central vertical line of the bucket that the center of the sheave $p$ is. The object of this is because the draft on the sheave $p$ is twice as much as that on the point $e$. The sheaves $p''$ and $p'''$ are placed equally distant from the vertical line, because the draft on these is equal. In the upper sheave-plates, P', the sheaves $p'$ and $p''''$ are placed equally distant from the central vertical line, because the draft on these is also equal. By this peculiar arrangement it is evident that the resultant draft is vertical and equally distributed laterally, and the working end of the closing-chain is brought into the central vertical line of the bucket. To sufficiently spread the chain at the bottom, and otherwise enable this peculiar arrangement of the chain to be employed, the two small sheaves $p''$ and $p'''$ are employed instead of one large one, which would be impracticable.

D represents the opening and lowering chain, which is attached to and near the center of the head-plate C.

Fig. 3 represents the transverse shape of the head-plate C and the foot-plate C', which consists of a solid disk with radial slotted projections, into which the carrying-arms B B B are secured by bolts $b'\ b'\ b'$.

Fig. 2 illustrates the peculiar transverse form of the several sections H H H of the bucket. The interior surface of every other section is in the form of a circle, being thickened on the outer surface at the center, so as to be slightly oval, while the intermediate sections, transversely, are in the form of a circle on the outer surface, and thickened at the center on the inner surface. The object of this peculiar lateral formation of the several sections is, first, to give them greater strength (at the center) without making the edges too thick, and also to make the outer surface of alternate sections to correspond with the interior surface of their adjacent sections, so they will, when opened, pass over each other with the least possible difference in the length of the carrying-arms B B, and, further, to bring the adjacent edges of the several sections as nearly as possible in a vertical line with each other when the bucket is closed.

Figs. 9 and 10 represent the elbows of the carrying-arms B B, which are enlarged, as shown at $b$ $b$, to form wings between which the working-arms A A are worked, and provided with vertical side support as the bucket is being closed, and to furnish attachment for the working-arms outside of the blades or sections H H of the bucket to give the closing-power greater effect in closing the bucket.

Fig. 9 is a section through the line $x$ $x$ of Fig. 10.

Fig. 11 is a section through the line $y$ $y$ of Fig. 8 to represent cheek-plates G, which are cast on the foot-plate C', and are secured to the sides of the lower sheave-block, P, to stiffen and support the same and to furnish sockets in which to secure the stop-rods F F. As the bucket is being closed the top of these stop-rods F F strikes against the lower side of the head-plate C when the bucket is fully closed to prevent the closing-chain from unduly straining the carrying-arms. In handling some materials it is not necessary to fully close the bucket. Therefore, to prevent the complete closing, and so thereby to increase the capacity of the bucket as well, these stop-rods F F are made adjustable by being provided with set-screws $g$ $g$, in order to raise them up to limit the closing of the bucket at any desirable point.

Fig. 1 illustrates the opening-stop of the bucket. At $h$ $h$, on the outer surface of the alternate sections H H which slide under the alternate outer sections when the bucket is open, there are secured strong slugs, against which the upper edge of the outer sections strike to limit the opening motion of the bucket.

Figs. 4, 5, and 6 represent the method of applying to the points of the several sections of the bucket, or to alternate points thereof, rollers or casters to protect the flooring of scows or other vessels when the depth of the materials handled is not sufficient for this purpose.

Figs. 5 and 6 are sections through the line $w$ $w$ of Fig. 4. Fig. 5 shows the position of a section of the bucket when it (the bucket) is open, with the caster J resting on the floor of the vessel; and Fig. 6 represents the same when the bucket is closed.

I is a triangular case that fits onto the point of the section H, and $i$ is a set-screw that holds it from slipping off, and the roller of the caster is held by suitable ears extending down from the case I. When these rollers J J strike the floor they prevent the other points from coming to the floor, while those which are provided with the casters roll on the floor without injuring the floor of the vessel.

The vertical form of the several sections H H H of the bucket is that of a circle whose center is at the working point of the carrying-arms H H H, where they are bolted to the foot-plate C', so that the central vertical line of each section follows in the curved track of the point of the section, thus preventing all lateral movement of the material to be grappled by the act of closing and filling the bucket.

What I claim as new, and desire to secure by Letters Patent, is—

1. In connection with the semi-globular bucket, Fig. 1, the combination of the radial head-plate C and radial foot-plate C', with the sheave-blocks P' and P, the working-arms A A A, and carrying-arms B B B, as and for the uses described.

2. In connection with the semi-globular bucket, Fig. 1, the combination and peculiar arrangement of the sheave-blocks P' and P, the sheaves $p$ $p'$ $p''$ $p'''$ $p''''$, and the closing and hoisting chain E E E, substantially in the manner and for the purposes set forth.

3. The peculiar transverse form of the sections H H H, Fig. 2, the alternate sections being circular on the inside surface and oval on the outside surface, and the intermediate alternate sections being circular on the outside surface and oval on the inside surface, in the manner and for the purpose described.

4. In connection with the semi-globular bucket, Fig. 1, the combination of the cheek-plates G G and stop-rods F F, as and for the purpose described.

5. In connection with the semi-globular bucket, Fig. 1, the method of providing an opening-stop for the bucket by securing at the proper point on the outer surface of alternate sections H H of the bucket the lugs $h$ $h$, Fig. 1, as and for the purposes set forth.

6. In connection with the semi-globular bucket, Fig. 1, the peculiar wing shape $b$ $b$ of the carrying-arms B B B, where the working-arms A A A attach thereto and work therein, Figs. 9 and 10, substantially in the manner and for the purpose set forth.

7. In combination with the semi-globular bucket, Fig. 1, the adjustable casters J J, as shown in Figs. 4, 5, and 6, substantially as and for the purpose described.

FRANK G. JOHNSON.

Witnesses:
JNO. H. HAYWARD,
JNO. J. MALMAN.